US008747220B2

(12) United States Patent
Castle et al.

(10) Patent No.: US 8,747,220 B2
(45) Date of Patent: Jun. 10, 2014

(54) METHODS, SYSTEMS, AND APPARATUSES FOR WAGERING GAMES INCLUDING PLAYER-BANKED SIDE BETS

(75) Inventors: Louis Castle, Las Vegas, NV (US); Roger M. Snow, Las Vegas, NV (US)

(73) Assignee: SHFL entertainment, Inc., Las Vegas, NV (US)

( * ) Notice: Subject to any disclaimer, the term of this patent is extended or adjusted under 35 U.S.C. 154(b) by 0 days.

(21) Appl. No.: 13/611,002

(22) Filed: Sep. 12, 2012

(65) Prior Publication Data

US 2014/0073417 A1 Mar. 13, 2014

(51) Int. Cl.
*G06F 17/00* (2006.01)

(52) U.S. Cl.
USPC .......................................................... 463/26

(58) Field of Classification Search
CPC ............................... G07F 17/3244; A63F 1/00
USPC .................. 463/11–13, 16–26; 273/292, 293
See application file for complete search history.

(56) References Cited

U.S. PATENT DOCUMENTS

| | | | |
|---|---|---|---|
| 4,836,553 | A | 6/1989 | Suttle et al. |
| 4,948,134 | A | 8/1990 | Suttle et al. |
| 5,248,142 | A | 9/1993 | Breeding et al. |
| 5,275,411 | A | 1/1994 | Breeding |
| 5,324,041 | A | 6/1994 | Boylan et al. |
| 5,580,061 | A | 12/1996 | Kong et al. |
| 5,584,486 | A | 12/1996 | Franklin et al. |
| 5,597,162 | A | 1/1997 | Franklin et al. |
| 5,653,444 | A | 8/1997 | Dahl et al. |
| 5,851,011 | A | 12/1998 | Lott et al. |
| 5,863,041 | A | 1/1999 | Boylan et al. |
| 5,931,472 | A | 8/1999 | Ko et al. |
| 6,007,424 | A | 12/1999 | Evers et al. |
| 6,012,719 | A | 1/2000 | Webb et al. |
| 6,070,876 | A | 6/2000 | Ko et al. |
| 6,113,103 | A | 9/2000 | Mostashari et al. |

(Continued)

FOREIGN PATENT DOCUMENTS

| | | |
|---|---|---|
| WO | 2008061001 | 5/2008 |
| WO | 2009061618 | 5/2009 |

OTHER PUBLICATIONS

Las Vegas Poker Promotions, Jumbo Hold'em, Gaming at Station Casinos, "Jumbo Hold'em, Bad Beat Progressive!" <<http://www.stationcasinos.com/gaming/poker/promos/jumboholdem/>> Mar. 20, 2012, 2 pages.

(Continued)

*Primary Examiner* — Ronald Laneau
(74) *Attorney, Agent, or Firm* — TraskBritt

(57) ABSTRACT

Methods of administering wagering games may comprise accepting a first wager from individual players to play against a dealer. A second wager may be accepted from at least two players to play against one another. A portion of the second wager may be placed in a first pot. A remainder of the second wager may be placed in a second pot. Cards may be dealt to each player and to the dealer. The first wager may be resolved for each player against the dealer. The second wager may be resolved for the at least two players against one another. At least a portion of the first pot may be awarded to at least one player at a conclusion of each round of play. At least a portion of the second pot may be awarded to at least one player holding a predetermined winning hand.

24 Claims, 6 Drawing Sheets

(56) References Cited

U.S. PATENT DOCUMENTS

| | | | |
|---|---|---|---|
| 6,146,270 | A | 11/2000 | Huard et al. |
| 6,267,671 | B1 | 7/2001 | Hogan |
| 6,270,078 | B1 | 8/2001 | Leone et al. |
| 6,345,823 | B1 | 2/2002 | Webb |
| 6,386,973 | B1 | 5/2002 | Yoseloff |
| 6,422,564 | B1 | 7/2002 | Baranauskas |
| 6,446,972 | B1 | 9/2002 | Brunelle |
| 6,481,719 | B2 | 11/2002 | Webb |
| 6,491,302 | B1 | 12/2002 | Boylan et al. |
| 6,568,682 | B1 | 5/2003 | Hogan et al. |
| 6,609,711 | B1 | 8/2003 | Campbell |
| 6,698,758 | B2 | 3/2004 | Hodge |
| 6,702,289 | B1 | 3/2004 | Feola |
| 6,729,620 | B2 | 5/2004 | Jones |
| 6,776,415 | B2 | 8/2004 | Robinson et al. |
| 6,789,800 | B2 | 9/2004 | Webb |
| 6,793,220 | B1 | 9/2004 | Feola |
| 6,802,510 | B1 | 10/2004 | Haber |
| 6,805,353 | B2 | 10/2004 | Williams |
| 6,896,265 | B1 | 5/2005 | Schlumbrecht |
| 7,195,243 | B2 | 3/2007 | Kenny et al. |
| 2003/0155713 | A1 | 8/2003 | Jones et al. |
| 2004/0038720 | A1 * | 2/2004 | Valente .......................... 463/11 |
| 2005/0164762 | A1 | 7/2005 | Smith et al. |
| 2005/0170875 | A1 | 8/2005 | Snow |
| 2005/0269783 | A1 | 12/2005 | Snow |
| 2006/0058087 | A1 | 3/2006 | White et al. |
| 2006/0084505 | A1 | 4/2006 | Yoseloff et al. |
| 2006/0287103 | A1 | 12/2006 | Crawford et al. |
| 2006/0290059 | A1 | 12/2006 | Scott |
| 2007/0054733 | A1 | 3/2007 | Baerlocher |
| 2007/0060240 | A1 * | 3/2007 | White ............................. 463/13 |
| 2008/0007003 | A1 | 1/2008 | Davis et al. |
| 2009/0005144 | A1 | 1/2009 | Moody |
| 2009/0181742 | A1 * | 7/2009 | Jackson .......................... 463/13 |
| 2009/0227364 | A1 | 9/2009 | Kelly et al. |
| 2010/0016050 | A1 | 1/2010 | Snow et al. |
| 2012/0280454 | A1 * | 11/2012 | Snow ............................ 273/292 |
| 2013/0157752 | A1 * | 6/2013 | Yoseloff .......................... 463/25 |

OTHER PUBLICATIONS

U.S. Appl. No. 13/353,194, filed Jan. 18, 2012, titled "Network Gaming Architecture, Gaming Systems, and Related Methods," by Costello et al.

U.S. Appl. No. 13/215,156, filed Aug. 22, 2011, titled "Six-Card Poker Game," by Roger M. Snow.

PCT International Search Report and Written Opinion of the International Searching Authority for PCT/US2013/038688, dated Oct. 10, 2013, 10 pages.

* cited by examiner

METHODS, SYSTEMS, AND APPARATUSES FOR WAGERING GAMES INCLUDING PLAYER-BANKED SIDE BETS

CROSS-REFERENCE TO RELATED APPLICATION

The subject matter of the present application is related to the subject matter of U.S. patent application Ser. No. 11/591,259 filed Oct. 31, 2006, to Snow, the disclosure of which is incorporated herein in its entirety by this reference.

FIELD

The disclosure relates generally to methods of administering wagering games for casinos and other gaming establishments. More specifically, disclosed embodiments relate to methods of administering wagering games including at least one non-house-banked side bet.

BACKGROUND

In conventional poker games, players play against one another to win a pot, commonly known as "player-banked" games. In such poker games, a casino or other gaming establishment hosting the game may receive its funds by charging a room, table, or seat fee to participants, by charging an hourly rate for participation, or by taking a commission (e.g., a rake) on wagers. Losses from players are redistributed to other players. However, modified poker games and other wagering games, such as blackjack, may pit players against a dealer and are commonly known as "house-banked" games. In such games, a casino or other gaming establishment hosting the game may receive its funds directly from losing wagers made by the players, which may average out to a certain percentage of wagers (i.e., a "house advantage") for the game. Suboptimal play by players may result in additional funds beyond a theoretical house advantage (i.e., the percent of wagers the house is expected to retain assuming that players and dealers engage in optimal strategic play and cheating does not occur) being collected by the house, which may increase house profits.

BRIEF SUMMARY

In some embodiments, methods of administering wagering games may comprise accepting a first wager from individual players to play a wagering game against a dealer. A second wager may be accepted from at least two players to play the wagering game against one another. A portion of the second wager may be placed in a first pot. A remainder of the second wager may be placed in a second pot. Cards may be dealt to each player and to the dealer. The first wager may be resolved for each player against the dealer according to a set of game rules applicable to the first wager. The second wager may be resolved for the at least two players against one another according to a set of game rules applicable to the second wager. At least a portion of the first pot may be awarded to at least one player at a conclusion of each round of play. At least a portion of the second pot may be awarded to at least one player holding a predetermined winning hand.

In other embodiments, methods of administering wagering games may comprise accepting an underlying game wager from individual players to play a wagering game against a dealer. A two-part pot wager may be accepted from at least two players to play the wagering game against one another. A first part of the two-part pot wager may be placed in a community pot. A second part of the two-part pot wager may be placed in a progressive pot. Cards may be dealt to each player and to the dealer. The underlying game wager may be resolved for each player against the dealer according to a set of game rules for the underlying game. The first part of the two-part pot wager for the at least two players against one another may be resolved according to the set of game rules. The community pot may be awarded to at least one player at a conclusion of each round of play. The second part of the two-part pot wager is resolved. At least a portion of the progressive pot may be awarded to at least one player holding a predetermined winning hand. The second part of the two-part wager may be retained in the progressive pot and subsequent second parts of two-part wagers are added to the progressive pot after each round of play during which a predetermined winning hand is not held by any player eligible to win the second pot.

In still other embodiments, gaming tables for administering wagering games may comprise a playing surface including at least one player interface, at least one dealer interface; and at least one processor programmed. The at least one processor may be programmed to accept a first wager from individual players to play a wagering game against a dealer and a second wager from at least two players to play the wagering game against one another. The at least one processor may be programmed to place a portion of the second wager in a first pot and to place a remainder of the second wager in a second pot. The at least one processor may be programmed to resolve the first wager for each player against the dealer according to a set of game rules applicable to the first wager and to resolve the second wager for the at least two players against one another according to a set of game rules applicable to the second wager, wherein at least a portion of the first pot may be awarded to at least one player at a conclusion of each round of play. The at least one processor may be programmed to award at least a portion of the second pot to at least one player holding a predetermined winning hand.

In yet other embodiments, systems for administering wagering games may comprise a game engine configured to be accessed by a client server over a network. The game engine may be programmed to accept an authorization instruction from individual players to place a first wager to play a wagering game against a dealer and to accept an authorization instruction from at least two players to place a second wager to play the wagering game against one another. The game engine may be programmed to place a portion of the second wager in a first pot and to place a remainder of the second wager in a second pot. The game engine may be programmed to resolve the first wager for each player against the dealer according to a set of game rules applicable to the first wager and to resolve the second wager for the at least two players against one another according to a set of game rules applicable to the second wager, wherein at least a portion of the first pot may be awarded to at least one player at a conclusion of each round of play. The game engine may be programmed to generate an instruction to award at least a portion of the second pot to at least one player holding a predetermined winning hand.

Further embodiments may include one, some, or all of the following: The acts of the dealer may be carried out by a visual representation of a dealer, the visual representation being generated and/or displayed by a computer. The visual representation may be a virtual person (e.g., an animation), or may be a transmission (e.g., a video) of an actual person. The visual representation may be part of an online gaming experience of the disclosed game. The acts described in this disclosure associated with a dealer, including dealing cards, displaying or turning cards over, receiving or paying bets, or any other actions, may be represented in any way when used in an online environment. For example, the cards associated with a dealer action, described as being dealt or otherwise handled by a dealer, may appear as virtual cards or as transmitted pictures of physical cards. This may include a display of virtual card decks where each deck, individual card, and hand is displayed to an online player in a manner consistent with the game play disclosed herein, but may or may not include a visual representation of a dealer with the cards. Likewise, betting activity may be displayed in any manner to a player, including, but not limited to, virtual chips, betting pools, numbers, or other indicia of a bet amount.

The online experience may involve players playing remotely (e.g., in a different physical location) from the dealer, the location of a game server, or both, interacting through a networked connection that may include, but is not limited to, the Internet. The online game play may involve players who are also physically remote from each other. Remote connections may use networks involving several types of network links including, but not limited to, the Internet. Networked connections allowing physically remote players to play a game using a game server or system may be part of an implementation of a virtual or online gaming environment.

The actions described in this disclosure as the acts of a player, including betting, card selection (if any), card discards (if any), or any other actions, may be carried out over a network where the indicated actions are received as input to a device. The input-receiving device is typically physically remote from the game server or game host and connected over a long-distance network, but could be implemented over a wired or wireless LAN in one building, or even in one room, for example. In one embodiment, game play generated at the server or host location may be displayed on the same device as the receiving device. In some embodiments, game play may be conveyed to remote players in devices separate from the devices receiving input from a player, such as public screens or publicly broadcast data about a game coupled with individual or private input devices. The reception of an input at a device may be accomplished through any technology adapted for such a purpose including, but not limited to, keypads, keyboards, touchpads, mice, optical location devices, eye movement/location detectors, sound input devices, etc. When discussing a device, it is understood the device may comprise multiple components and be complex, including hardware components combined with firmware and/or software, and may itself be a subcomponent of a larger system.

Yet other embodiments may comprise apparatuses and systems for administering wagering games according to embodiments of the disclosure.

BRIEF DESCRIPTION OF THE DRAWINGS

While the specification concludes with claims particularly pointing out and distinctly claiming what are regarded as embodiments of the disclosure, various features and advantages of embodiments encompassed by the disclosure may be more readily ascertained from the following description when read in conjunction with the accompanying drawings, in which:

DETAILED DESCRIPTION

The illustrations presented herein are not meant to be actual views of any particular act in a method of administering a wagering game, apparatus or system for administering a wagering game, or component thereof, but are merely idealized representations employed to describe illustrative embodiments. Thus, the drawings are not necessarily to scale. Additionally, elements common between figures may retain the same or similar numerical designation.

The terms "gaming," "gambling," or the like, refer to activities, games, sessions, rounds, hands, rolls, operations, and other events related to wagering games such as web-based games, casino games, card games, dice games, and other games whose outcome is at least partially based on one or more random events ("chance" or "chances"), and on which wagers may be placed by a player. In addition, the words "wager," "bet," "bid" or the like, refer to any type of wagers, bets or gaming ventures that are placed on random events, whether of monetary or non-monetary value. Points, credits, and other items of value may be purchased, earned, or otherwise issued prior to beginning the wagering game. In some embodiments, purchased points, credits, or other items of value may have an exchange rate that is not one-to-one to the currency used by the user. For example, a wager may include money, points, credits, symbols, or other items that may have some value related to a wagering game. Wagers may be placed in wagering games that are "play for pay" as well as "play for fun," as will be described in more detail below.

Disclosed embodiments relate generally to methods of administering wagering games including at least one non-house-banked side bet. More specifically, disclosed are methods of administering wagering games that may include a house-banked wager and a player-banked wager, wherein a portion of the player-banked wager is placed in a pot to be won by at least one player at a conclusion of each round of play and a remainder of the player-banked wager is placed in a progressive pot.

Figure 1:
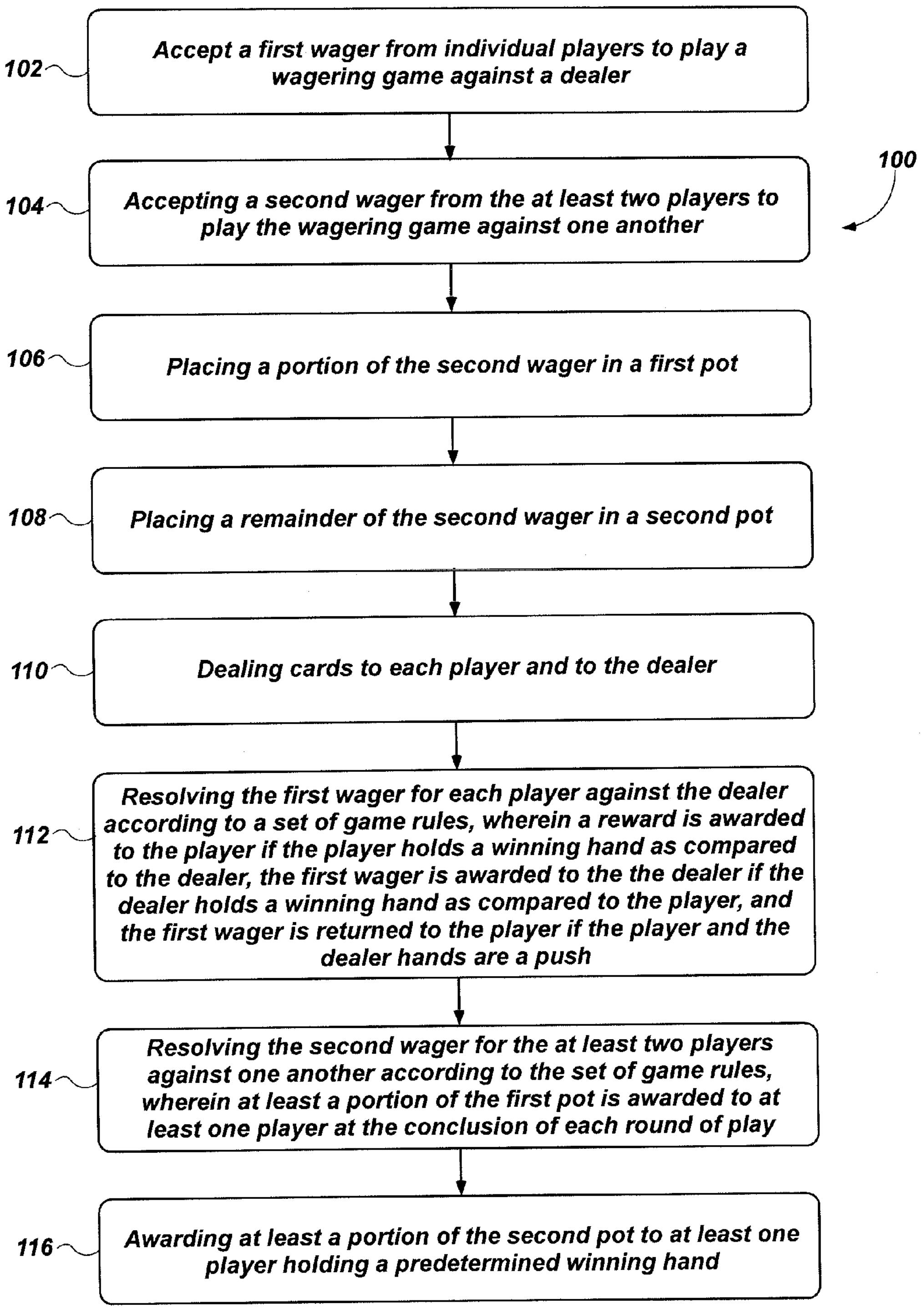
FIG. 1 is a flowchart diagram of a method of administering a wagering game.

Referring to FIG. 1, a flowchart diagram of a method 100 of administering a wagering game is shown. The method 100 may include accepting a first wager from individual players to play a wagering game against a dealer, as indicated at 102. The first wager may be a house-banked wager made on an underlying wagering game, such as, for example, poker or blackjack. The individual players wishing to participate in the wagering game may authorize the first wager to be made, for example, by providing physical monies (e.g., bills or coins) or physical representations of monies (e.g., chips) at a local gaming table 300 or 400 (see FIGS. 3 and 4), or by electronically authorizing a transfer of monies or digital representations of monies (e.g., digital representations of bills or coins, digital representations of chips, numerical quantities of money, numerical quantities of points, or numerical quantities of credits) at a local or remote electronic gaming device 200, 300, 400, 520, or 600 (see FIGS. 2 through 6). As a specific, non-limiting example, the individual players may begin a gaming session at an electronic gaming table 300 or 400 (see FIGS. 3 and 4) (e.g., by logging into a player account, by swiping a player account card, or by swiping a credit card) and interact with personal interface devices 232, 316, 432, 610, 614, 618 (see FIGS. 2 through 6) (e.g., touch-screens, keyboards, buttons, switches, etc.) to authorize placement of the first wager. The first wager may be accepted, for example, by placing physical monies or physical representations of monies in a designated area of a gaming table 300 or 400 (see FIGS. 3 and 4), by displaying digital representations of monies in a designated area of at least one display screen 274, 316, 330, 432, 460, 464, or 618 (see FIGS. 2 through 4 and 6), or by displaying a monetary amount of the first wager on at least one display screen 274, 316, 330, 432, 460, 464, or 618 (see FIGS. 2 through 4 and 6), which may be remotely located from a dealer or game server 506 (see FIG. 5).

A second wager may be accepted from at least two players to play the wagering game against one another, as indicated at 104. The second wager may be a two-part, player-banked pot wager, which may enable individual players to play the wagering game concurrently against the dealer and against one another. Such a second wager may be particularly attractive to players who perceive themselves as being skilled at the wagering game, at least in comparison to other players participating in the wagering game, because player losses on the second wager may be redistributed to winning players, rather than to the house. The second wager may be authorized and accepted, for example, by performing any of those acts described previously in connection with the first wager. The second wager may be maintained separate from the first wager. For example, the physical monies, physical representations of monies, or digital representations of monies from each of the first and second wagers may be maintained in physically separate regions on a gaming table 300 or 400 (see FIGS. 3 and 4) or on at least one display screen 274, 316, 330, 432, 460, 464, or 618 (see FIGS. 2 through 4 and 6). Placement of the first and second wagers before any dealing of cards takes place may be an initial round of betting.

In some embodiments, players may be required to make the second wager to participate in the wagering game. In such embodiments, the second wager may, therefore, be a mandatory wager. In other embodiments, fewer than all players participating in the wagering game may make the second wager while still participating in the underlying wagering game. In such embodiments, players who make only the first wager may still play the wagering game against the dealer, but may be ineligible to win any portion of the second wager. An eligibility identifier may be generated for each player from which the second wager was accepted in embodiments where fewer than all players participating in the wagering game make the second wager. For example, a physical disc (e.g., a button) may be placed in a player area of each player who made the second wager, a digital identifier (e.g., a digital representation of such a physical disc, a character, or a symbol) may be displayed on a personal display screen 274, 316, 432, or 618 (see FIGS. 2 through 4 and 6) of each player who made the second wager, or a digital identifier may be displayed on a common display screen 330, 460, or 464 (see FIGS. 3 and 4) viewable by all players.

A portion of the second wager may be placed in a first pot, as indicated at 106. For example, a first part of a two-part pot wager may be placed a community pot, at least a portion of which may be won by at least one player at a conclusion of each round of play. The portion of the second wager may be placed in the first pot, for example, by physically separating monies or physical representations of monies from the first wager and placing some of those monies or physical representations of monies within a designated area on a gaming table 300 or 400 (see FIGS. 3 and 4), by electronically separating digital representations of monies and displaying some of those digital representations of monies within a designated area on at least one display screen 274, 316, 330, 432, 460, 464, or 618 (see FIGS. 2 through 4 and 6), or by displaying a monetary amount of the first pot on at least one display screen 274, 316, 330, 432, 460, 464, or 618 (see FIGS. 2 through 4 and 6).

A remainder of the second wager may be placed in a second pot, as indicated at 108. For example, a second part of the two-part pot wager may be placed in a progressive pot, which may increase in quantity from round of play to round of play until at least one player holds a predetermined winning hand. The remainder of the second wager may be placed in the second pot, for example, by performing any of those acts described previously in connection with the first pot. The portion of the second wager placed in the first pot may be at least as great as the remainder of the second wager placed in the second pot. Such a structuring of the second wager may entice players, especially players who perceive themselves as being more skilled than other players playing the wagering game, to make the second wager in embodiments where the second wager is optional because it increases the portion of the second wager that is awarded at the conclusion of each round of play, the award of which may be at least partially influenced by player skill. For example, the portion of the second wager placed in the first pot may be one-half, two-thirds, three-fourths, four-fifths, or an even greater relative portion of the second wager. Conversely, the remainder of the second wager placed in the second pot may be one-half, one-third, one-fourth, one-fifth, or an even smaller relative portion of the second wager. The second pot may be maintained separate from the first pot. For example, the physical monies, physical representations of monies, or digital representations of monies in each of the first and second pots may be maintained in physically separate regions on a gaming table 300 or 400 (see FIGS. 3 and 4) or on at least one display screen 274, 316, 330, 432, 460, 464, or 618 (see FIGS. 2 through 4 and 6).

Cards may be dealt to each player and to the dealer, as indicated at 110. For example, physical cards that have been randomized (e.g., by manual or automated shuffling) may be distributed sequentially to each player and to the dealer, the order of which may be dictated by a set of game rules, or digital representations of cards (e.g., images resembling physical cards or characters and symbols) may be displayed on personal display screens 274, 316, 432, or 618 (see FIGS. 2 through 4 and 6) of individual players. In one embodiment, the electronically generated cards are displayed to remote players over networks. In some embodiments, some or all of the cards dealt to individual players may be obscured or otherwise rendered difficult or impossible to view by other players, which may enable players to employ skill or strategy when deciding whether to remain eligible to win the second wager (e.g., by increasing the amount of the second wager) or to fold.

In some embodiments, subsequent rounds of betting may take place intermittently during the dealing of cards, after all cards have been dealt, or both. During such subsequent rounds of betting, the players may increase the amounts of their first wagers to increase the amounts they are eligible to win from the house, check in accordance with some game rules, or fold and relinquish the amounts in the first wagers to the house. The increases in amounts for the first wagers may be accepted by performing any of the acts described previously in connection with the first wager.

The players may also increase the amounts of their second wagers, which may correspondingly increase the amounts they are eligible to win from the first and second pots, check in accordance with some game rules, or fold and relinquish the amounts of their respective second wagers to the first and second pots. Folding with respect to one of the first or the second wagers may also constitute folding with respect to the other of the first and second wagers in some embodiments. In other embodiments, players may be permitted to fold one of the first and second wagers while remaining eligible to win the other of the first and second wagers. The players may be required to have originally placed the second wager during the initial round of betting to contribute further to the second wager during subsequent rounds of betting in some embodiments. In other embodiments, the players may be permitted to initially place the second wager during subsequent rounds of betting. The proportional amount by which the second wager increases the first and second pots may remain the same during subsequent rounds of betting as during the initial round of betting in some embodiments. In other embodiments, the proportional amounts of the second wager that are placed in the first and second pots, respectively, may be different during the initial and subsequent rounds of betting. For example, the portion of the second wager placed in the first pot may be greatest during the initial round of betting and may decrease in subsequent rounds of betting. Such a structure for the second wager may entice players to place the second wager early in the game to increase an amount of the second wager that is won at the conclusion of each round of play, the award of which may be at least partially influenced by player skill. The increases in amounts for the second wagers may be accepted by performing any of the acts described previously in connection with the first wager.

The first wager may be resolved for each player against the dealer according to a set of game rules, as indicated at 112. For example, each player's hand may be compared to the dealer's hand, and the rules of poker, a variant of poker, blackjack, or a variant of blackjack may dictate whether an individual player holds a winning hand, the dealer holds a winning hand as compared to an individual player, or an individual player's and dealer's hands are a push (e.g., a tie or a standoff). A reward is awarded to the player if the player holds a winning hand as compared to the dealer. For example, a winning player may receive an amount equal to the amount of the first wager, including any increases in the first wager made during subsequent rounds of betting, in addition to having the amount of the first wager returned (i.e., an even money payout) or may receive an amount that is a multiple of the amount of the first wager in addition to having the amount of the first wager returned, a factor of multiplication increasing as the likelihood of receiving a given hand decreases (i.e., an odds payout). The award may be disbursed to the player by, for example, physically transferring monies or representations of monies to the player, by electronically crediting a player account, or by electronically crediting a credit card or bank account. The first wager is awarded to the dealer if the dealer holds a winning hand as compared to the player. The first wager may be transferred to the house, for example, by physically collecting monies or representations of monies, electronically transferring funds, points, or credits from a player account, or by electronically charging a credit card or bank account. The first wager is returned to the player if the player and the dealer hands are a push. For example, where a player and the dealer hold equally ranked hands (e.g., both hold a king high in poker or both hold 20 in blackjack), the hands may be a push, and the first wager may be returned to the player. The first wager may be returned to the player by performing any of the acts described previously in connection with the award for winning the first wager.

The second wager may be resolved for the two or more players against one another according to the set of game rules, as indicated at 114. The same set of rules may dictate which hands are winning hands for both the first and second wagers. An outcome of the second wager may be independent of an outcome of the first wager because of the difference in comparing an individual player hand with the dealer hand and comparing each player hand with those of each of the other players. For example, an individual player may hold a losing hand when compared to the dealer, but may hold a winning hand when compared to the other players participating in the wagering game. Conversely, an individual player may hold a winning hand when compared to the dealer, but may hold a losing hand when compared to the other players participating in the wagering game. Any combination of winning, losing, and pushing may be possible for an individual player for the first and second wagers. There may be no rake or commission retained by the house on the second wager. Such a wager may be particularly enticing to players who perceive themselves as being skilled at the wagering game, especially as compared to other participating players, because all losses on the second wager, including those attributable to inexperience or suboptimal strategy, are redistributed to one or more other players.

At least a portion of the first pot is awarded to at least one player at the conclusion of each round of play. For example, an entire amount of the first pot may be awarded to a player when the player is eligible to win the first pot and the player holds the highest ranked hand of any player eligible to win the first pot. As another example, the first pot may be divided equally among players when those players are eligible to win the first pot and the players hold equally ranked hands that are ranked higher than hands of other players eligible to win the first pot. A round of play may comprise an initial round of betting, dealing of cards, any subsequent round or rounds of betting, and resolution of wagers including the first wager and at least the first pot from the second wager. The first pot or a portion of the first pot may be awarded to the player or players by performing any of the acts described previously in connection with the award for winning the first wager.

At least a portion of the second pot may be awarded to at least one player holding a predetermined winning hand, as indicated at 116. For example, the second part of a two-part second wager may be resolved by examining hands held by the players who are eligible to win the second pot to determine whether any hand held by an eligible player qualifies as a predetermined winning hand. The second pot or a portion of the second pot may be awarded to the player or players holding a predetermined winning hand by performing any of the acts described previously in connection with the award for winning the first wager.

Hands qualifying as predetermined winning hands may be selected, for example, at a beginning of the wagering game and remain the same until a conclusion of the wagering game, after each time a player has achieved a previously selected predetermined wining hand, or at a beginning of each round of play. In some embodiments, only a single hand may be selected as the predetermined winning hand. For example, at least one player may be awarded at least a portion of the second pot only when the player has achieved a royal flush, a straight flush, four of a kind, a full house, a flush, a flush of a specific suit, a straight, a straight of a specific set of cards, three of a kind, three of a specific kind, two pair, two pair of specific rank, one pair, a specific pair, or a specific high card in embodiments where the wagering game comprises poker or a variant of poker. As continuing examples, at least one player may be awarded at least a portion of the second pot only when the player has achieved a blackjack formed with a specific combination of cards, any blackjack, a hand ranked 21 formed with a specific number or a specific rank or cards, any hand ranking 21, a hand ranked 20 formed with a specific number or a specific rank or cards, any hand ranking 20 or higher, a hand ranked 19 of a specific number or a specific rank of cards, or any hand ranking 19 or higher in embodiments where the wagering game comprises blackjack or a variant of blackjack. In other embodiments, any hand from a set of hands may qualify as a predetermined winning hand. For example, hands qualifying as predetermined winning hands may be selected to comprise a five-card straight and higher-ranked hands, a flush and higher-ranked hands, a full house and higher-ranked hands, or four of a kind and higher-ranked hands in embodiments where the wagering game comprises poker or a variant of poker. A continuing examples, hands qualifying as predetermined winning hands may be selected to comprise an 18 and higher-ranked hands, a 19 and higher-ranked hands, or a 20 and higher-ranked hands in embodiments where the wagering game comprises blackjack or a variant of blackjack. Hands qualifying as predetermined winning hands may be selected at random, according to a rotating schedule, based on a likelihood of achieving the predetermined winning hands, based on a period of time that has passed since a predetermined winning hand was last achieved, or any combination of these.

In some embodiments, an entire amount of the second pot may be awarded. For example, the entire amount of the second pot may be awarded to a single player when that player is the only player eligible to win the second pot holding a hand qualifying as a predetermined winning hand. As another example, the entire amount of the second pot may be awarded to a single player when that player is eligible to win the second pot and holds a highest-ranking predetermined winning hand, while other players eligible to win the second pot but holding lower-ranked predetermined winning hands may not receive any of the second pot. As yet another example, the second pot may be divided equally among at least two players when those players are eligible to win the second pot and each player holds a predetermined winning hand, regardless of rank, or each player holds an equally ranked predetermined winning hand. As still another example, the second pot may be divided unequally (e.g., based on a comparative likelihood of achieving a given hand) among at least two players when those players are eligible to win the second pot and each player holds a predetermined winning hand and the predetermined winning hands are not of equal rank. In other embodiments, only a portion of the second pot may be awarded. For example, fixed odds payouts comprising a portion of the second pot may be awarded from the second pot.

The player or players holding a predetermined winning hand may be required to have placed the second wager for each round of play subsequent to a round of play during which the second pot was empty to be eligible to win the second pot or any portion of the second pot in some embodiments. For example, a player who joins the wagering game at the beginning of a round of the wagering game may be required to place the second wager for each round of play to remain eligible to win the second pot. As another example, a player who joins the wagering game after the wagering game is already in progress may be required to begin placing the second wager after another player has won or other players have won the second pot to be eligible to win the second pot. Such a requirement may entice players to begin playing the wagering game early on to become eligible to win the second pot as soon as possible and may entice players specifically to participate in the second wager, rather than just the first wager, in embodiments where placing the second wager is optional. Despite being ineligible to win the second pot, players who have broken a chain of continuity in placing the second wager may nonetheless be enticed to place the second wager to become eligible to win the first pot when they perceive that they are playing against players of lesser skill. Setting the portion of the second wager that is placed in the first pot at a relatively high proportion (e.g., two-thirds or greater) may further entice such players to participate in the second wager. When players who are not eligible to win the second pot nonetheless place the second wager in an attempt to win the first pot, other players who are eligible to win the second pot may further be enticed to place the second wager and maintain their eligibility to win the second pot because the second pot may grow faster due to the contributions from players not eligible to win the second pot.

In other embodiments, a player may be eligible to win the second pot or a portion of the second pot during any round that player has placed the second wager, regardless of whether the player has continuously placed the second wager in each round of play subsequent a round of play during which the second pot was empty. For example, the player may be eligible to win a fixed odds payout from the second pot, but not the entire second pot, when the player has broken a chain of continuity in placing the second wager but has placed the second wager and holds a predetermined winning hand in a specific round of play. In still other embodiments, a player may be eligible to win the second pot or a portion of the second pot during any round subsequent a round during which the player placed the second wager. For example, the player may be eligible to win a fixed odds payout or an even money payout from the second pot, but not the entire pot, when the player has broken a chain of continuity in placing the second wager but has placed the second wager in a previous round of play and holds a predetermined winning hand in a specific round of play. Such eligibility structures may entice players to place the second wager, despite having broken a chain of continuity in placing the second wager, to participate in the first pot and become eligible for the second pot or a portion of the second pot.

The remainder of the second wager may be retained in the second pot and subsequent remainders of second wagers may be added to the second pot after each round of play during which a predetermined winning hand is not held by any player eligible to win the second pot. For example, the second pot may grow progressively with each round of play during which a predetermined winning hand is not achieved by any player who is eligible to win the second pot. In some embodiments, growth of the second pot may be limited to contributions, which may be from a specific group of players. For example, the contributions to the second pot may be limited to remainders of second wagers placed by players at a specific table in a casino or other gaming establishment. In such an example, both the first and second pots may come from and be awarded to players at that specific table. As another example, the contributions to the second pot may be limited to remainders of second wagers placed by players at a specific grouping of tables (e.g., two tables, three tables, four tables, etc.) in a casino or other gaming establishment. In such an example, the first pot may come from and be awarded to players at individual tables, while the second pot may come from and be awarded to players at the specific grouping of tables. As yet another example, the contributions to the second pot may not be limited to any specific grouping. In such an example, the first pot may come from and be awarded to players at individual tables, while the second pot may come from and be awarded to any players playing the wagering game in the casino, group of casinos, other gaming establishment, or group of other gaming establishments.

Various platforms are contemplated as suitable for administering wagering games as disclosed herein. For example, embodiments of wagering games may be implemented such that one or more players may place wagers and engage in game play according to the rules of the wagering games. For example, wagering games may be implemented on gaming tables, which may include physical gaming features, such as physical cards, physical chips, and may include a live dealer. More specifically, a live dealer may deal physical cards, accept wagers, issue payouts, and perform other administrative functions of game play. Some embodiments may be implemented on electronic devices enabling electronic gaming features, such as providing electronic displays for display of virtual cards, virtual chips, game instructions, pay tables, etc., and providing processors for generating random card values and applying game rules to dealt cards. Some embodiments may include features that are a combination of physical and electronic features.

As an example, embodiments of wagering games may be implemented on an individual gaming device for accepting wagers that has a display screen and inputs for enabling game play of the wagering games. Such an individual gaming device may be linked with other gaming devices that may be operated, for example, by other players. Some individual electronic gaming devices may be referred to as an individual player “cabinet” and may be stationary, such as being located on a casino floor. Other individual electronic gaming devices may be portable devices that may be carried to different locations by the player. Portable devices may include both display of the ongoing game play and input reception for game play by a player, or, may be for receiving input from a player while the game play is displayed on a public monitor, or other display device.

Figure 2:
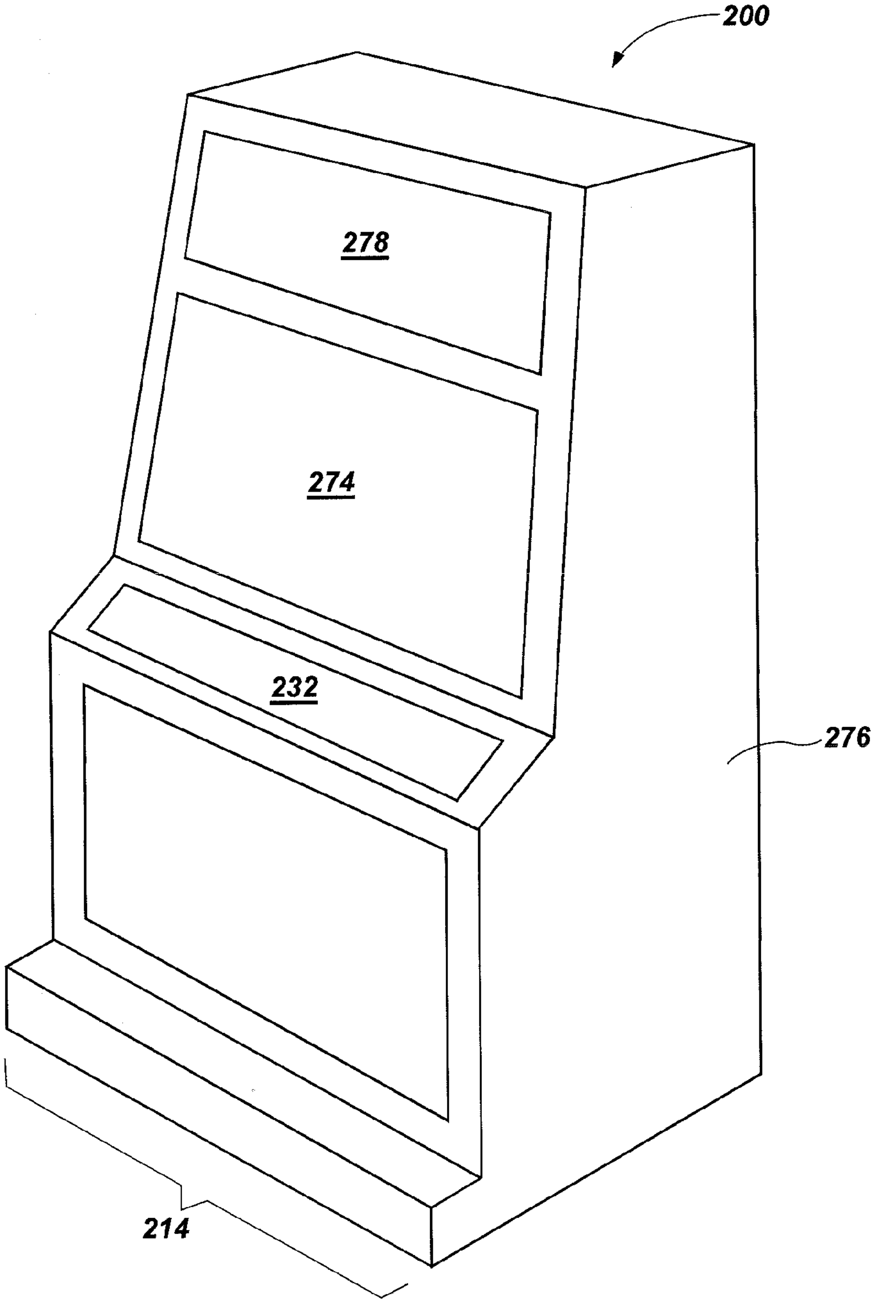
FIG. 2 is a perspective view of an individual electronic gaming device configured to administer wagering games.

Referring to FIG. 2, an example of an individual electronic gaming device 200 configured for implementation of embodiments of wagering games according to the present disclosure is shown. The individual electronic gaming device 200 may include an individual player position 214 that includes a player input area 232 for a player to interact with the individual electronic gaming device 200. The electronic gaming device 200 may include a gaming screen 274 configured to display indicia for interacting with the individual electronic gaming device 200, such as through processing one or more stored programs to implement the rules of game play at the individual electronic gaming device 200. Accordingly, game play may be accommodated without involving physical playing cards, poker chips, and/or live personnel. The action may instead be simulated by a control processor (not shown) interacting with and controlling the individual electronic gaming device 200. Although the figure has an outline of a traditional gaming cabinet, gaming device 200 may be implemented in any number of ways including, but not limited to, client software downloaded to a portable device, such as a smart phone, tablet, or laptop personal computer. Gaming device 200 may also be a non-portable personal computer (e.g., a desktop or all-in-one computer) or other computing device. In some embodiments, client software is not downloaded but is native to the device, or otherwise delivered with the device when received by a player.

The gaming screen 274 may be carried by a generally vertically extending cabinet 276 of the individual electronic gaming device 200. The individual electronic gaming device 200 may further include banners (not shown) configured to communicate rules of game play and/or the like, such as along a top portion 278 of the cabinet 276 of the gaming device 200. The individual electronic gaming device 200 may further include additional decorative lights (not shown), and speakers (not shown) for transmitting and/or receiving sounds during game play. Further detail of an example of an individual electronic gaming device (as well as other embodiments of tables and devices) is disclosed in U.S. patent application Ser. No. 13/215,156, filed Aug. 22, 2011, and titled “Methods of Managing Play of Wagering Games and Systems for Managing Play of Wagering Games,” the disclosure of which is incorporated herein in its entirety by this reference.

Some embodiments may be implemented at locations that include a plurality of player stations. Such player stations may include an electronic display screen for display of game information, such as displaying virtual cards, virtual chips, and game instructions, and for accepting wagers and facilitating credit balance adjustments. Such player stations may, optionally, be integrated in a table format. While some features may be automated through electronic interfaces (e.g., virtual cards, virtual chips, etc.), some features may remain in the physical domain. As such, the game play may be administered by a live dealer, a virtual dealer, or a combination of both.

Figure 3:
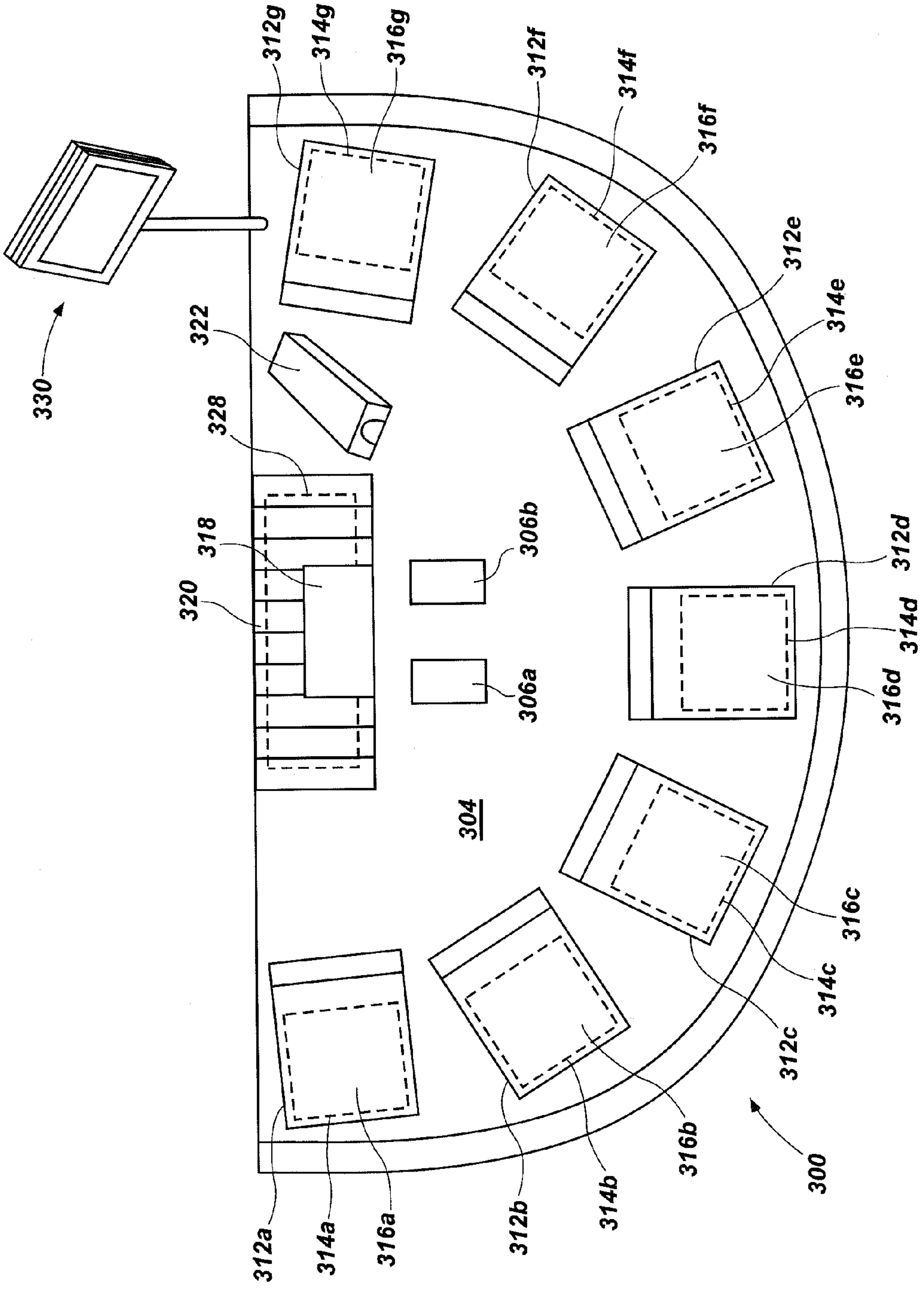
FIG. 3 is a perspective view of a table configured for administration of wagering games.

Referring to FIG. 3, an example of a suitable table 300 configured for implementation of embodiments of wagering games according to the present disclosure is shown. The table 300 may include a playing surface 304. The table 300 may include a plurality of player stations **312*a*-312*g*. Each player station 312*a*-312*g* may include a player interface 316*a*-316*g*, which may be used for display of game information (e.g., game instructions, input options, wager information including virtual chips, game outcomes, etc.). The player interface 316*a*-316*g* may include a display screen in the form of a touch screen, which may in one embodiment be at least substantially flush with the playing surface 304. Each player interface 316*a*-316*g* may be coupled respectively with its own game processor 314*a*-314*g* (shown in dashed lines), although in some embodiments, a central game processor 328 (shown in dashed lines) may be employed. In some embodiments, a combination of individual game processors 314*a*-314*g* and a central game processor 328** may be employed.

The table 300 may further include additional features, such as a dealer chip tray 320, which may be used by the dealer to cash players in and out of the wagering game, whereas wagers and balance adjustments during game play may be performed using virtual chips. For embodiments using physical cards **306*a*, 306*b*, the table 300 may further include a card-handling device 322 that may be configured to shuffle, read, and deliver physical cards for the dealer and players to use during game play or, alternatively, a card shoe configured to read and deliver cards that have already been randomized. For embodiments using virtual cards, such virtual cards may be displayed at the individual player interfaces 316*a*-316*g***. Common virtual cards may be displayed in a common card area (not shown).

The table 300 may further include a dealer interface 318, which, like the player interfaces **314*a*-314*g*, may include touch screen controls for assisting the dealer in administering the wagering game. The table 300 may further include an upright display 330 configured to display images that depict game information such as pay tables, hand counts, historical win/loss information by player, and a wide variety of other information considered useful to the players. The upright display 330** may be double-sided to provide such information to players as well as to the casino pit.

Further detail of an example of a table and player displays is disclosed in U.S. Patent Application Pub. No. 2010/

0016050, filed Jul. 15, 2008, now U.S. Pat. No. 8,262,475 issued Sep. 11, 2012, and titled "Chipless Table Split Screen Feature," the disclosure of which is incorporated herein in its entirety by this reference. Although an embodiment is described showing individual discrete player stations, in some embodiments, the entire playing surface 304 may be an electronic display that is logically partitioned to permit game play from a plurality of players for receiving inputs from, and displaying game information to, the players, the dealer, or both.

Figure 4:
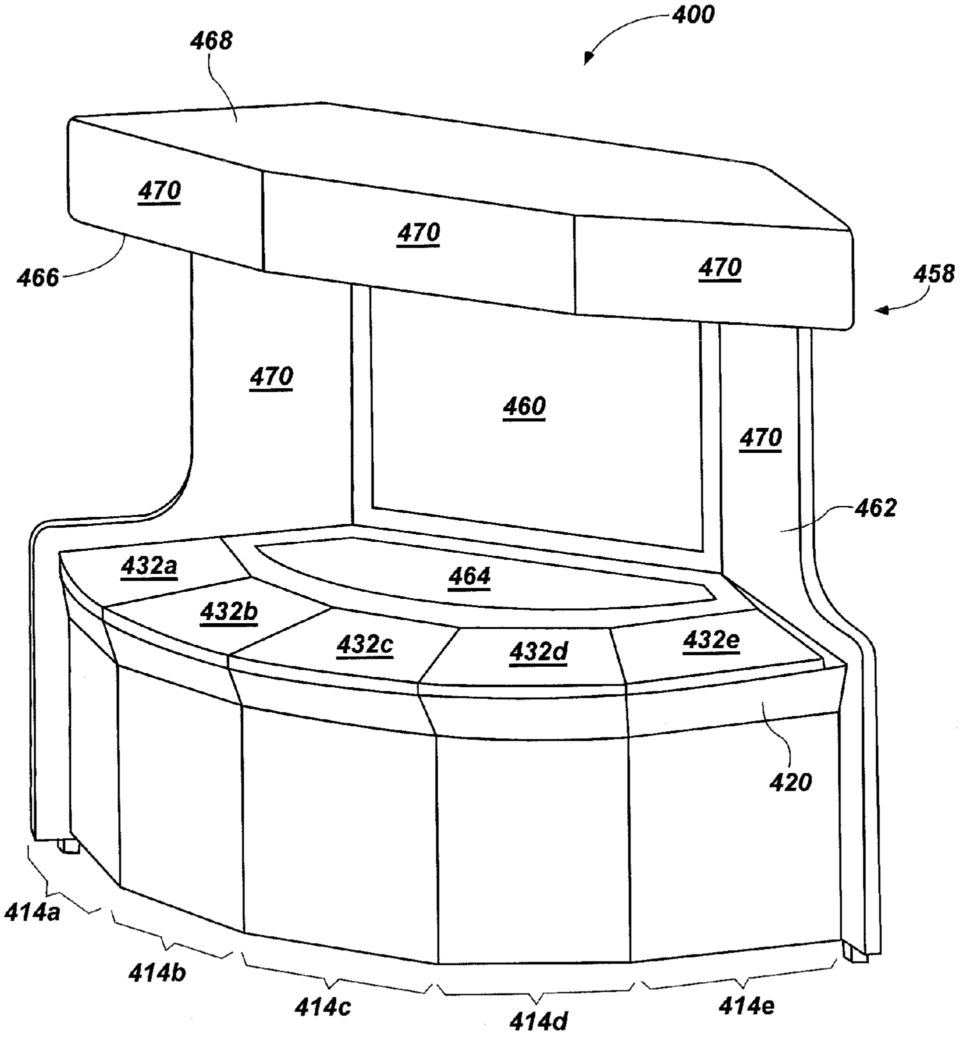
FIG. 4 is a perspective view of another embodiment of a table configured for administration of wagering games.

Referring to FIG. 4, another example of a suitable table 400 configured for implementation of embodiments of wagering games having a virtual dealer according to the present disclosure is shown. The table 400 may include player positions 414 that are arranged in a bank about an arcuate edge 420 of a video device 458 that may comprise a card display screen 464 and a dealer screen 460. The dealer screen 460 may display a video simulation of the dealer (i.e., a virtual dealer) for interacting with the video device 458, such as through processing one or more stored programs to implement the rules of game play at the video device 458. The dealer screen 460 may be carried by a generally vertically extending cabinet 462 of the video device 458. The card display screen 464 may be configured to display at least one or more of the dealer's cards, community cards, and/or player's cards by the virtual dealer depicted on the dealer screen 460 (virtual dealer not depicted in FIG. 4).

Each of the player positions 414*a*-414*e* may include a player area 432*a*-432*e*, which is configured for wagering and game play interactions with the video device 458 and/or virtual dealer. Accordingly, game play may be accommodated without involving physical playing cards, poker chips, and/or live personnel. The action may instead be simulated by a control processor (not shown) interacting with and controlling the video device 458. The control processor may be located internally within, or otherwise proximate to, the video device 458. The control processor may be programmed, by known techniques, to implement the rules of game play at the video device 458. As such, the control processor may interact and communicate with display/input interfaces and data entry inputs for each player area 432*a*-432*e* of the video device 458. Other embodiments of tables and gaming devices may include a control processor that may be similarly adapted to the specific configuration of its associated device.

The video device 458 may further include banners (not shown) configured to communicate rules of play and/or the like, which may be located along one or more walls 470 of the cabinet 462. The video device 458 may further include additional decorative lights (not shown) and speakers (not shown), which may be located on an underside surface 466, for example, of a generally horizontally depending top 468 of the cabinet 462 of the video device 458 generally extending toward the player positions 414*a*-414*e*.

Further detail of an example of a table and player displays is disclosed in U.S. Patent Application Pub. No. 2005/0164762, filed Jan. 26, 2004, now U.S. Pat. No. 8,272,958, issued Sep. 25, 2012, and titled "Automated Multiplayer Game table with Unique Image Feed of Dealer," the disclosure of which is incorporated herein in its entirety by this reference. Although an embodiment is described showing individual discrete player stations, in some embodiments, the entire playing surface (e.g., player areas 432*a*-432*e*, card display screen 464, etc.) may be an electronic display that is logically partitioned to permit game play from a plurality of players for receiving inputs from, and displaying game information to, the players, the dealer, or both.

Figure 5:
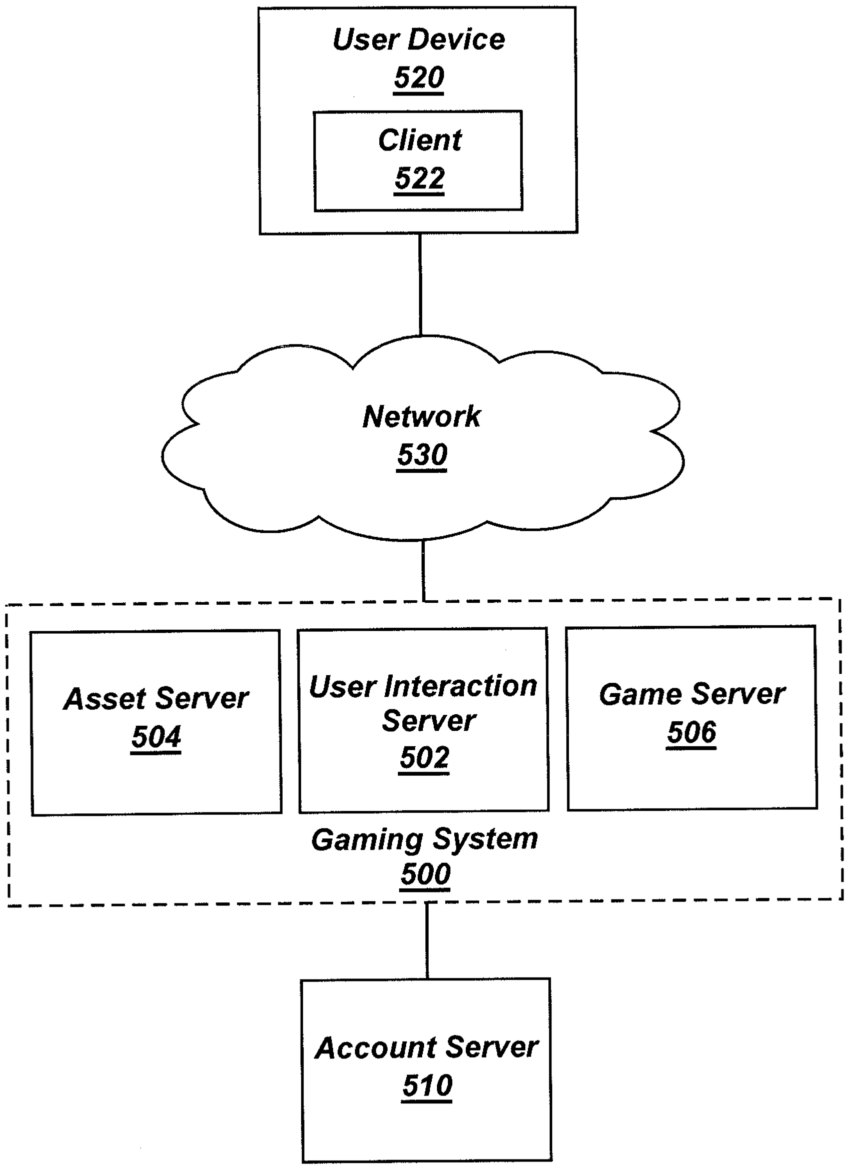
FIG. 5 is a schematic block diagram of a gaming system configured for administration of waging games.

Wagering games in accordance with embodiments of the disclosure may be administered over the Internet, or otherwise online, in one embodiment using a gaming system employing a client server architecture. Referring to FIG. 5, a schematic block diagram of a gaming system 500 for implementing wagering games according to an embodiment is shown. The gaming system 500 enables end users to access proprietary and/or non-proprietary game content. Such game content may include, without limitation, various types of wagering games such as card games, dice games, big wheel games, roulette, scratch off games ("scratchers"), and any other wagering game where the game outcome is determined, in whole or in part, by one or more random events. This includes, but is not be limited to, Class II and Class III games as defined under 25 U.S.C. §2701 et seq. ("Indian Gaming Regulatory Act"). Such games may include banked and/or non-banked games.

The wagering games supported by the gaming system 500 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits (or other symbols) may be issued to a player to be used for the wagers. A player may be credited with credits in any way allowed including, but not limited to, a player purchasing credits, being awarded credits as part of a contest or a win event in this or another game (including non-wagering games), being awarded credits as a reward for use of a product, casino or other enterprise, time played in one session, games played, or may be as simple as virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes sites having both play-for-fun and wagering games, including issuance of free credits usable to play the play-for-fun games. This may attract players to the site and to the games before they engage in wagering. In some embodiments, a limited number of free or promotional credits may be issued to entice players to play the games. Another method of issuing credits includes free credits in exchange for identifying friends who may want to play. In another embodiment, additional credits may be issued after a period of time has elapsed to encourage the player to resume playing the game. The gaming system 500 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 500 may include a gaming platform that establishes a portal for an end user to access a wagering game hosted by a game server 506 through a user interaction server 502. The user device 520 may communicate with a user interaction server 502 of the gaming system 500 using a network 530 (e.g., the Internet). The user interaction server 502 may communicate with the game server 506 and provide game information to the user. In some embodiments, the game server 506 may also be a game engine. In some embodiments, a single user device communicates with a game provided by the game server 506, while other embodiments may include a plurality of user devices 520 configured to communicate and provide end users with access to the same game provided by game server 506. In addition, a plurality of end users may access a single user interaction server 502, or, a plurality of user interaction servers 502 to access game server 506.

The user interaction server 502 may communicate with the user device 520 to enable access to the gaming system 500. The user interaction server 502 may enable a user to create and access a user account and interact with game server 506. The user interaction server 502 may enable users to initiate new games, join existing games, and interface with games being played by the user.

The user interaction server 502 may also provide a client 522 for execution on the user device for accessing the gaming system 500. The client 522 provided by the gaming system 500 for execution on the user device 520 can comprise a variety of implementations according to the user device 520 and method of communication with the gaming system 500. In one embodiment, the user device 520 connects to the gaming system 500 using a web browser and the client 522 executes within a browser window or frame of the web browser. In another embodiment, the client 522 is a standalone executable on the user device 520.

In one embodiment, the client 522 may comprise a relatively small amount of script (e.g., JAVASCRIPT®), also referred to as a "script driver," including scripting language that controls an interface of the client 522. The script driver may include simple function calls requesting information from the gaming system 500. In other words, the script driver stored in the client 522 may merely include calls to functions that are externally defined by, and executed by, the gaming system 500. As a result, the client 522 may be characterized as a "thin client." As that term is used herein, the client 522 may be little more than a script player. The client 522 may simply send requests to the gaming system 500 rather than performing logic itself. The client 522 receives player inputs and the player inputs are passed to gaming system 500 for processing and executing the wagering game. In one embodiment, this includes providing specific graphical display information to client 522 as well as game outcomes.

In other embodiments, the client 522 comprises an executable program rather than a script. In that case, client 522 may do more local processing than does a script driver, such as calculating where to show what game symbols upon receiving a game outcome from game server 506 through user interaction server 502. In one embodiment, it may be that portions of asset server 504 are loaded onto the client 522, and used by the client 522 in processing and updating graphical displays. Due to security and integrity concerns, most embodiments will have the bulk of the processing of the game play performed in the gaming system 500. However, some embodiments may include significant game processing by client 522 when the client 522 and user device 520 are considered trustworthy, or, when there is reduced concern for security and integrity in the displayed game outcome. In most embodiments, it is expected that some form of data protection, such as end-to-end encryption, will be used when data is transported over network 530. Network 530 may be any network including, but not limited to, the Internet.

In an embodiment where the client 522 implements further logic and game control methodology beyond the thin client, the client 522 may parse and define player interactions prior to passing the player interactions to the gaming system 500. Likewise, when the client 522 receives a gaming interaction from the gaming system 500, the client 522 may be configured to determine how to modify the display as a result of the gaming interaction. The client 522 may also allow the player to change a perspective or otherwise interact with elements of the display, which do not change aspects of the game.

The gaming system 500 may include an asset server 504, which may host various media assets (e.g., audio, video, and image files) that may be sent to the client 522 for presenting the various wagering games to the end user. In other words, in this embodiment, the assets presented to the end user may be stored separately from the client 522. In one embodiment, the client 522 requests the assets appropriate for the game played by the user; in other embodiments, especially those using thin clients, just those assets that are needed for a particular display event will be sent by game server 500 when the game server determines they are needed, including as few as one asset. In one example, the client 522 may call a function defined at the user interaction server 502 or asset server 504, which may determine which assets are to be delivered to the client 522 as well as how the assets are to be presented by the client 522 to the end user. Different assets may correspond to the various clients that may have access to the game engine 506 or to different games to be played.

The game server 506 is configured to perform game play methods and determine game play outcomes that are provided to the user interaction server 502 to be transmitted to user device 520 for display on the end user's computer. For example, the game server 506 may include game rules for one or more wagering games, such that the game server 506 controls some or all of the game flow for a selected wagering game, as well as the determining game outcomes. Game server 506 may include pay tables and other game logic. The game server 506 also performs random number generation for determining random game elements of the wagering game. In one embodiment, the game server 506 is separated from the user interaction server 502 by a firewall or other method of preventing unauthorized access to the game server 506 from the general members of the network 530.

The user device 520 may present a gaming interface to the player and communicate the user interaction to the gaming system 500. The user device 520 may be any electronic system capable of displaying gaming information, receiving user input, and communicating the user input to the gaming system 500. As such, the user device 520 can be a desktop computer, a laptop, a tablet computer, a set-top box, mobile devices including, but not limited to, smart phones, kiosks, terminals, or other computing devices. The user device 520 may operate the client 522 for connecting to the interactive gaming system 500 as described above. The client 522 may be a specialized application or may be executed within a generalized application capable of interpreting instructions from the interactive gaming system 500, such as a web browser.

The client 522 may interface with an end user through a web page, or an application that runs on a device including, but not limited to, a smartphone, tablet, or general computer, or be any other computer program configurable to access the gaming system 500. The client 522 may be illustrated within a casino webpage (or other interface) indicating that the client 522 is embedded into a webpage, which is supported by a web browser executing on the client device 520.

In one embodiment, the gaming system 500 may be operated by different entities. The user device 520 may be operated by a third party, such as a casino or an individual, that links to the gaming system 500, which may be operated, for example, by a wagering game service provider. Therefore, in some embodiments, the user device 520 and client 522 may be operated by a different administrator than the operator of the game server 506. In other words, the user device 520 may be part of a third-party system that does not administer or otherwise control the gaming system 500 or game server 506. In another embodiment, the user interaction server 502 and asset server 504 are provided by a third-party system. For example, a gaming entity (e.g., a casino) may operate the user interaction server 502 or user device 520 to provide its customers access to game content managed by a different entity, which may control game server 506, amongst other functionality. In some embodiments, these functions are operated by the same administrator. For example, a gaming entity (e.g., a casino) may elect to perform each of these functions in-house, such as providing both the access to the user device 520 and the actual game content and providing administration of the gaming system 500.

The gaming system 500 may communicate with external account servers 510, optionally through another firewall. For example, the gaming system 500 itself may not directly accept wagers or issue payouts. That is, the gaming system 500 may facilitate online casino gaming, but may not be part of a self-contained online casino itself. Instead, the gaming system 500 may facilitate the play of wagering games owned and controlled by a company offering games and gaming products and services, such as Shuffle Master, Inc. Another entity (e.g., a casino or any account holder or financial system of record) may operate and maintain its external account servers 510 to accept bets and make payout distributions. The gaming system 500 may communicate with the account servers 510 to verify the existence of funds for wagering, and instruct the account server 510 to execute debits and credits.

In some embodiments, the gaming system 500 may directly accept bets and make payout distributions, such as in the case where an administrator of the gaming system 500 operates as a casino. As discussed above, the gaming system 500 may be integrated within the operations of a casino rather than separating out functionality (e.g., game content, game play, credits, debits, etc.) among different entities. In addition, for play-for-fun wagering games, the gaming system 500 may issue credits, take bets, and manage the balance of the credits according to the game outcomes, but may not permit payout distributions or be linked to account server 510 that permits payout distributions. Such credits may be issued for free, through purchase, or for other reasons, without the ability for the player to cash out. Such play-for-fun wagering games may be played on platforms that do not permit traditional gambling, such as to comply with jurisdictions that do not permit online gambling.

The gaming system 500 may be configured in many ways, from a fully integrated single system to a distributed server architecture. The asset server 504, user interaction server 502, game server 506, and account server 510 may be configured as a single, integrated system of code modules running on a single server or machine, where each of the servers is functionality implemented on a single machine. In such a case, the functionality described herein may not be implemented as separate code modules. The asset server 504, user interaction server 502, game server 506, and account server 510 may also be implemented as a plurality of independent servers, each using its own code modules running on a separate physical machine, and may further include one or more firewalls between selected servers (depending on security needs). Each server could communicate over some kind of networked connection, potentially as varied as that described for network 530. Further, each single server shown in FIG. 4 may be implemented as a plurality of servers with load balancing and scalability factors built into the embodiment. All such embodiments and variations are fully contemplated.

Additional features may be supported by the game server 506, such as hacking and cheating detection, data storage and archival, metrics generation, messages generation, output formatting for different end user devices, as well as other features and operations. For example, the gaming system 500 may include additional features and configurations as described in U.S. patent application Ser. No. 13/353,194, filed Jan. 18, 2012, and titled “Network Gaming Architecture, Gaming Systems, and Related Methods,” which is incorporated by reference herein in its entirety by this reference.

The network 530 may enable communications between the user device 520 and the gaming system 500. A network (not shown) may also connect the gaming system 500 and account server 510, and further one or more networks may interconnect one or more of the other servers shown collectively as game system 500. In one embodiment, the network 530 uses standard communications technologies and/or protocols. Thus, the network 530 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 530 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 530 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 530 can include links comprising one or more networks such as the Internet.

Figure 6:
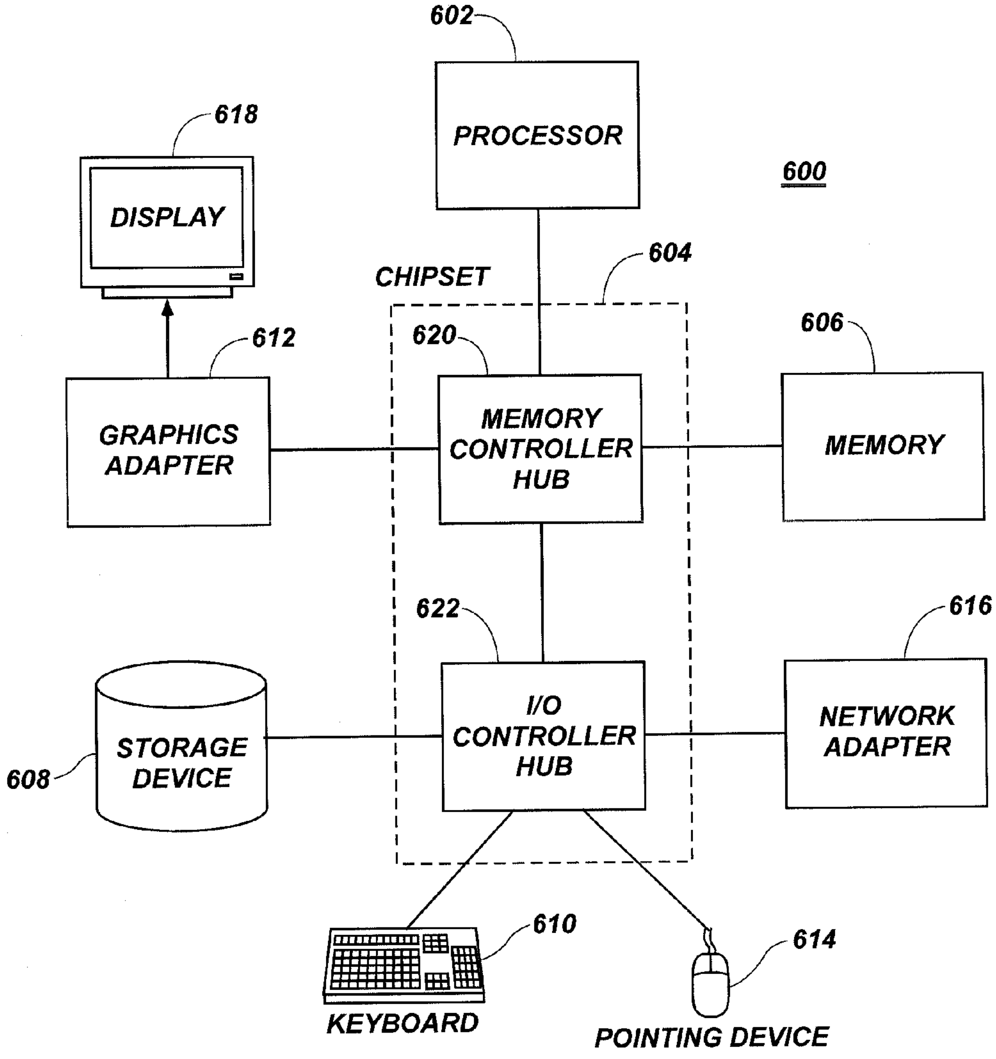
FIG. 6 is a high-level block diagram of a computer configured to act as a gaming system.

Referring to FIG. 6, a high-level block diagram of a computer 600 for acting as a gaming system 500 (see FIG. 5), or a component thereof, according to one embodiment is shown. Illustrated are at least one processor 602 coupled to a chipset 604, as indicated by dashed line. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disc read-only memory (CD-ROM), DVD, or a solid-state memory device (e.g., a flash drive). The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 acting as a gaming system 500 lacks a keyboard 610, pointing device 614, graphics adapter 612, and/or display 618. Moreover, the storage device 608 can be local and/or remote from the computer 600 (such as embodied within a storage area network (SAN)).

The gaming system 500 may comprise several such computers 600. The gaming system 500 may include load balancers, firewalls, and various other components for assisting the gaming system 500 to provide services to a variety of user devices.

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Additional, non-limiting example embodiments include the following:

Embodiment 1: A method of administering a wagering game may comprise: accepting a first wager from individual players to play a wagering game against a dealer; accepting a second wager from at least two players to play the wagering game against one another; placing a portion of the second wager in a first pot; placing a remainder of the second wager in a second pot; dealing cards to each player and to the dealer; resolving the first wager for each player against the dealer according to a set of game rules applicable to the first wager; resolving the second wager for the at least two players against one another according to a set of game rules applicable to the second wager, wherein at least a portion of the first pot is awarded to at least one player at a conclusion of each round of play; and awarding at least a portion of the second pot to at least one player holding a predetermined winning hand.

Embodiment 2: The method of Embodiment 1, wherein a reward associated with the first wager is awarded to the player if the player holds a winning hand as compared to the dealer, the first wager is awarded to the dealer if the dealer holds a winning hand as compared to the player, and the first wager is returned to the player, if the player and the dealer hands are a push.

Embodiment 3: The method of Embodiment 1 or Embodiment 2, further comprising retaining a remainder of the second wager in the second pot and adding subsequent remainders of second wagers to the second pot after each round of play during which a predetermined winning hand is not held by any player eligible to win the second pot.

Embodiment 4: The method of any one of Embodiments 1 through 3, wherein accepting the second wager comprises requiring each player to make the second wager to participate in the wagering game.

Embodiment 5: The method of any one of Embodiments 1 through 3, wherein accepting the second wager comprises accepting the second wager from fewer than all players participating in the wagering game.

Embodiment 6: The method of Embodiment 5, further comprising generating an eligibility identifier for each player from whom the second wager was accepted.

Embodiment 7: The method of any one of Embodiments 1 through 6, wherein awarding the at least a portion of the second pot comprises requiring the at least one player to have placed the second wager for each round of play subsequent to a round of play during which the second pot was empty to be eligible for the at least a portion of the second pot.

Embodiment 8: The method of any one of Embodiments 1 through 7, wherein awarding the at least a portion of the second pot comprises awarding an entire amount of the second pot.

Embodiment 9: The method of Embodiment 8, wherein awarding the entire amount of the second pot comprises dividing the second pot among at least two players.

Embodiment 10: The method of any one of Embodiments 1 through 7, wherein awarding the at least a portion of the second pot comprises awarding fixed odds payouts comprising a portion of the second pot from the second pot.

Embodiment 11: The method of any one of Embodiments 1 through 10, wherein the wagering game comprises poker or a variant of poker and further comprising selecting the predetermined winning hand to be a five-card straight or higher-ranked hand.

Embodiment 12: The method of any one of Embodiments 1 through 10, wherein the wagering game comprises blackjack or a variant of blackjack and further comprising selecting the predetermined winning hand to be any hand ranking 21.

Embodiment 13: The method of any one of Embodiments 1 through 12, wherein placing the portion of the second wager in the first pot comprises placing at least one-half of the second wager in the first pot.

Embodiment 14: The method of Embodiment 13, wherein placing the at least one-half of the second wager in the first pot comprises placing at least two-thirds of the second wager in the first pot.

Embodiment 15: A method of administering a wagering game, comprising: accepting an underlying game wager from individual players to play a wagering game against a dealer; accepting a two-part pot wager from at least two players to play the wagering game against one another; placing a first part of the two-part pot wager in a community pot; placing a second part of the two-part pot wager in a progressive pot; dealing cards to each player and to the dealer; resolving the underlying game wager for each player against the dealer according to a set of game rules for the underlying game; resolving the first part of the two-part pot wager for the at least two players against one another according to the set of game rules, wherein the community pot is awarded to at least one player at a conclusion of each round of play; and resolving the second part of the two-part pot wager, wherein at least a portion of the progressive pot is awarded to at least one player holding a predetermined winning hand, and wherein the second part of the two-part wager is retained in the progressive pot and subsequent second parts of two-part wagers are added to the progressive pot after each round of play during which a predetermined winning hand is not held by any player eligible to win the second pot.

Embodiment 16: The method of Embodiment 15, wherein a reward associated with the underlying game wager is awarded to the player if the player holds a winning hand as compared to the dealer, the underlying game wager is awarded to the dealer if the dealer holds a winning hand as compared to the player, and the underlying game wager is returned to the player if the player and the dealer hands are a push.

Embodiment 17: The method of Embodiment 15 or Embodiment 16, wherein accepting the two-part pot wager comprises requiring each player to make the two-part pot wager to participate in the wagering game.

Embodiment 18: The method of Embodiment 15 or Embodiment 16, wherein accepting the two-part pot wager comprises accepting the two-part pot wager from fewer than all players participating in the wagering game.

Embodiment 19: The method of Embodiment 18, further comprising generating an eligibility identifier for each player from whom the two-part pot wager was accepted.

Embodiment 20: The method of any one of Embodiments 15 through 19, wherein resolving the second part of the two-part pot wager, wherein at least a portion of the progressive pot is awarded to at least one player holding a predetermined winning hand, comprises requiring the at least one player to have placed the two-part pot wager for each round of play subsequent to a round of play during which the progressive pot was empty to be eligible for the at least a portion of the progressive pot.

Embodiment 21: The method of any one of Embodiments 15 through 20, wherein resolving the second part of the two-part pot wager comprises awarding an entire amount of the progressive pot to the at least one player holding the predetermined winning hand.

Embodiment 22: The method of Embodiment 21, wherein resolving the second part of the two-part pot wager comprises dividing the progressive pot among at least two players.

Embodiment 23: The method of any one of Embodiments 15 through 22, wherein placing the first part of the two-part pot wager in the community pot comprises placing at least two-thirds of the two-part pot wager in the community pot.

Embodiment 24: A gaming table for administering a wagering game may comprise: a playing surface including at least one player interface; at least one dealer interface; and at least one processor programmed to accept a first wager from individual players to play a wagering game against a dealer; accept a second wager from at least two players to play the wagering game against one another; place a portion of the second wager in a first pot; place a remainder of the second wager in a second pot; resolve the first wager for each player against the dealer according to a set of game rules applicable to the first wager; resolve the second wager for the at least two players against one another according to a set of game rules applicable to the second wager, wherein at least a portion of the first pot is awarded to at least one player at a conclusion of each round of play; and award at least a portion of the second pot to at least one player holding a predetermined winning hand.

Embodiment 25: A system for administering a wagering game may comprise: a game engine configured to be accessed by a client server over a network, the game engine being programmed to accept an authorization instruction from individual players to place a first wager to play a wagering game against a dealer; accept an authorization instruction from at least two players to place a second wager to play the wagering game against one another; place a portion of the second wager in a first pot; place a remainder of the second wager in a second pot; resolve the first wager for each player against the dealer according to a set of game rules applicable to the first wager; resolve the second wager for the at least two players against one another according to a set of game rules applicable to the second wager, wherein at least a portion of the first pot is awarded to at least one player at a conclusion of each round of play; and generate an instruction to award at least a portion of the second pot to at least one player holding a predetermined winning hand.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventor.

What is claimed is:

1. A method of administering a wagering game, comprising:

accepting a first wager from individual players to play a wagering game against a dealer by receiving a physical, monetarily valuable wagering element in a first designated area on a surface of a gaming table;

accepting a two-part pot wager from at least two players to play the wagering game against one another, wherein accepting the two-part pot wager comprises:

receiving a first part of the two-part pot wager in a community pot by positioning the wagering elements associated with the first part of the two-part pot wager in a third designated area on the surface of the gaming table; and receiving a second part of the two-part pot wager in a progressive pot by positioning the wagering elements associated with the second part of the two-part pot wager in a fourth designated area on the surface of the gaming table, the fourth designated area being separate and distinct from the third designated area;

dealing randomized physical cards from a standard, 52-card deck of playing cards to each player and to the dealer;

resolving the underlying game wager for each player against the dealer according to a set of game rules for the underlying game;

resolving the first part of the two-part pot wager for the at least two players against one another according to the set of game rules, wherein the community pot is awarded to at least one player at a conclusion of each round of play by physically transferring the wagering elements associated with the community pot to the at least one player at the conclusion of each round of play; and resolving the second part of the two-part pot wager, wherein at least a portion of the progressive pot is awarded to at least one player holding a predetermined winning hand by physically transferring the wagering elements associated with the at least a portion of the progressive pot to the at least one player holding the predetermined winning hand, and wherein the second part of the two-part wager is retained in the progressive pot and subsequent second parts of two-part wagers are added to the progressive pot after each round of play during which a predetermined winning hand is not held by any player eligible to win the second pot.

2. The method of claim 1, wherein a reward associated with the first wager is awarded to the player if the player holds a winning hand as compared to the dealer, the first wager is awarded to the dealer if the dealer holds a winning hand as compared to the player, and the first wager is returned to the player, if the player and the dealer hands are a push.

3. The method of claim 1, wherein accepting the second wager comprises requiring each player to make the second wager to participate in the wagering game.

4. The method of claim 1, wherein accepting the second wager comprises accepting the second wager from fewer than all players participating in the wagering game.

5. The method of claim 4, further comprising generating an eligibility identifier for each player from whom the second wager was accepted.

6. The method of claim 1, wherein awarding the at least a portion of the second pot comprises requiring the at least one player to have placed the second wager for each round of play subsequent to a round of play during which the second pot was empty to be eligible for the at least a portion of the second pot.

7. The method of claim 1, wherein awarding the at least a portion of the second pot comprises awarding an entire amount of the second pot.

8. The method of claim 7, wherein awarding the entire amount of the second pot comprises dividing the second pot among at least two players.

9. The method of claim 1, wherein awarding the at least a portion of the second pot comprises awarding fixed odds payouts comprising a portion of the second pot from the second pot.

10. The method of claim 1, wherein the wagering game comprises poker or a variant of poker and further comprising selecting the predetermined winning hand to be a five-card straight or higher-ranked hand.

11. The method of claim 1, wherein the wagering game comprises blackjack or a variant of blackjack and further comprising selecting the predetermined winning hand to be any hand ranking 21.

12. The method of claim 1, wherein placing the portion of the second wager in the first pot comprises placing at least one-half of the second wager in the first pot.

13. The method of claim 12, wherein placing the at least one-half of the second wager in the first pot comprises placing at least two-thirds of the second wager in the first pot.

14. A method of administering a wagering game, comprising:

accepting an underlying game wager from individual players to play a wagering game against a dealer by receiving a physical, monetarily valuable wagering element in a first designated area on a surface of a gaming table;

accepting a two-part pot wager from at least two players to play the wagering game against one another, wherein accepting the two-part pot wager comprises:

receiving a first part of the two-part pot wager in a community pot by positioning the wagering elements associated with the first part of the two-part pot wager in a third designated area on the surface of the gaming table;

receiving a second part of the two-part pot wager in a progressive pot by positioning the wagering elements associated with the second part of the two-part pot wager in a fourth designated area on the surface of the gaming table, the fourth designated area being separate and distinct from the third designated area;

dealing randomized physical cards from a standard, 52-card deck of playing cards to each player and to the dealer;

resolving the underlying game wager for each player against the dealer according to a set of game rules for the underlying game;

resolving the first part of the two-part pot wager for the at least two players against one another according to the set of game rules, wherein the community pot is awarded to at least one player at a conclusion of each round of play by physically transferring the wagering elements associated with the community pot to the at least one player at the conclusion of each round of play; and resolving the second part of the two-part pot wager, wherein at least a portion of the progressive pot is awarded to at least one player holding a predetermined winning hand by physically transferring the wagering elements associated with the at least a portion of the progressive pot to the at least one player holding the predetermined winning hand, and wherein the second part of the two-part wager is retained in the progressive pot and subsequent second parts of two-part wagers are added to the progressive pot after each round of play during which a predetermined winning hand is not held by any player eligible to win the second pot.

15. The method of claim 14, wherein a reward associated with the underlying game wager is awarded to the player if the player holds a winning hand as compared to the dealer, the underlying game wager is awarded to the dealer if the dealer holds a winning hand as compared to the player, and the underlying game wager is returned to the player if the player and the dealer hands are a push.

16. The method of claim 14, wherein accepting the two-part pot wager comprises requiring each player to make the two-part pot wager to participate in the wagering game.

17. The method of claim 14, wherein accepting the two-part pot wager comprises accepting the two-part pot wager from fewer than all players participating in the wagering game.

18. The method of claim 17, further comprising generating an eligibility identifier for each player from whom the two-part pot wager was accepted.

19. The method of claim 14, wherein resolving the second part of the two-part pot wager, wherein at least a portion of the progressive pot is awarded to at least one player holding a predetermined winning hand, comprises requiring the at least one player to have placed the two-part pot wager for each round of play subsequent to a round of play during which the progressive pot was empty to be eligible for the at least a portion of the progressive pot.

20. The method of claim 14, wherein resolving the second part of the two-part pot wager comprises awarding an entire amount of the progressive pot to the at least one player holding the predetermined winning hand.

21. The method of claim 20, wherein resolving the second part of the two-part pot wager comprises dividing the progressive pot among at least two players.

22. The method of claim 14, wherein placing the first part of the two-part pot wager in the community pot comprises placing at least two-thirds of the two-part pot wager in the community pot.

23. A gaming table for administering a wagering game, comprising:

a playing surface including at least one player interface;

at least one dealer interface; and at least one processor programmed to:

accept a first wager from individual players to play a wagering game against a dealer;

accept a second wager from at least two players to play the wagering game against one another;

place a portion of the second wager in a first pot;

place a remainder of the second wager in a second pot;

resolve the first wager for each player against the dealer according to a set of game rules applicable to the first wager;

resolve the second wager for the at least two players against one another according to a set of game rules applicable to the second wager, wherein at least a portion of the first pot is awarded to at least one player at a conclusion of each round of play;

generate an instruction to award at least a portion of the second pot to at least one player when the at least one player holds a predetermined winning hand; and generate an instruction to retain all remainders of all second wagers in the second pot when no player holds a predetermined winning hand, wherein all remainders of all second wagers in the second pot are available for at least one player to win in a future round of play.

24. A system for administering a wagering game, comprising:

a game engine configured to be accessed by a client server over a network, the game engine being programmed to:

accept an authorization instruction from individual players to place a first wager to play a wagering game against a dealer;

accept an authorization instruction from at least two players to place a second wager to play the wagering game against one another;

place a portion of the second wager in a first pot;

place a remainder of the second wager in a second pot;

resolve the first wager for each player against the dealer according to a set of game rules applicable to the first wager;

resolve the second wager for the at least two players against one another according to a set of game rules applicable to the second wager, wherein at least a portion of the first pot is awarded to at least one player at a conclusion of each round of play;

generate an instruction to award at least a portion of the second pot to at least one player when the at least one player holds a predetermined winning hand; and generate an instruction to retain all remainders of all second wagers in the second pot when no player holds a predetermined winning hand, wherein all remainders of all second wagers in the second pot are available for at least one player to win in a future round of play.

* * * * *

UNITED STATES PATENT AND TRADEMARK OFFICE

CERTIFICATE OF CORRECTION

PATENT NO. : 8,747,220 B2
APPLICATION NO. : 13/611002
DATED : June 10, 2014
INVENTOR(S) : Louis Castle et al.

It is certified that error appears in the above-identified patent and that said Letters Patent is hereby corrected as shown below:

In the claims:

| | | | |
|---|---|---|---|
| CLAIM 1, | COLUMN 23, | LINE 33, | change "a two part pot wager" to --a second wager-- |
| CLAIM 1, | COLUMN 23, | LINE 35, | change "the two-part pot wager" to --the second wager-- |
| CLAIM 1, | COLUMN 23, | LINE 36, | change "a first part of the two-part pot wager" to --a portion of the second wager-- |
| CLAIM 1, | COLUMN 23, | LINE 37, | change "community pot by positioning the wagering elements" to --first pot by positioning at least one physical, monetarily valuable wagering element-- |
| CLAIM 1, | COLUMN 23, | LINE 38, | change "the first part of the two-part pot wager" to --the portion of the second wager-- |
| CLAIM 1, | COLUMN 23, | LINE 39, | change "in a third designated" to --from each of the at least two players in a second designated-- |
| CLAIM 1, | COLUMN 23, | LINE 41, | change "a second part of the two-part pot wager" to --a remainder of the second wager-- |
| CLAIM 1, | COLUMN 23, | LINE 42, | change "progressive pot by positioning the wagering elements" to --second pot by positioning at least one physical, monetarily valuable wagering element-- |
| CLAIM 1, | COLUMN 23, | LINE 43, | change "the second part of the two-part pot wager" to --the remainder of the second wager-- |
| CLAIM 1, | COLUMN 23, | LINE 44, | change "a fourth designated" to --a third designated-- |
| CLAIM 1, | COLUMN 23, | LINE 45, | change "the fourth designated" to --the third designated-- |
| CLAIM 1, | COLUMN 23, | LINE 46, | change "the third designated" to --the second designated-- |

Signed and Sealed this
Twenty-fifth Day of August, 2015

Michelle K. Lee

Michelle K. Lee
*Director of the United States Patent and Trademark Office*

In the claims (continued):

| | | | |
|---|---|---|---|
| CLAIM 1, | COLUMN 23, | LINE 50, | change "the underlying game wager" to --the first wager-- |
| CLAIM 1, | COLUMN 23, | LINES 51-52, | change "rules for the underlying game;" to --rules applicable to the first wager;-- |
| CLAIM 1, | COLUMN 23, | LINE 53, | change "the first part of the two-part pot wager" to --the second wager-- |
| CLAIM 1, | COLUMN 23, | LINE 54, | change "to the set" to --to a set-- |
| CLAIM 1, | COLUMN 23, | LINE 55, | change "rules, wherein the community pot" to --rules applicable to the second wager, wherein at least a portion of the first pot-- |
| CLAIM 1, | COLUMN 23, | LINE 58, | change "the community pot" to --the at least a portion of the first pot-- |
| CLAIM 1, | COLUMN 23, | LINE 59, | change "round of play; and" to --round of play;-- |
| CLAIM 1, | COLUMN 23, | LINES 60-62, | change "resolving the second part of the two-part pot wager, wherein at least a portion of the progressive pot is awarded to" to --awarding at least a portion of the second pot to-- |
| CLAIM 1, | COLUMN 23, | LINE 65, | change "progressive pot to" to --second pot to-- |
| CLAIM 1, | COLUMN 23, | LINE 66, | change "winning hand, and" to --winning hand; and-- |
| CLAIM 1, | COLUMN 23, | LINES 66-67, | delete "wherein the second part of the two-part wager is retained in the progressive" |
| CLAIM 1, | COLUMN 24, | LINES 1-2, | change "pot and subsequent second parts of two-part wagers are added to the progressive pot" to --retaining all wagering elements in the second pot when no player holds a predetermined winning hand, making those wagering elements available for a player to win in a future round of play, and adding subsequent remainders of second wagers to the second pot-- |